(12) United States Patent
Kumai

(10) Patent No.: US 11,346,990 B2
(45) Date of Patent: May 31, 2022

(54) POLARIZING ELEMENT, LIQUID CRYSTAL APPARATUS AND ELECTRONIC APPARATUS

(71) Applicant: SEIKO EPSON CORPORATION, Tokyo (JP)

(72) Inventor: Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 206 days.

(21) Appl. No.: 16/589,413

(22) Filed: Oct. 1, 2019

(65) Prior Publication Data

US 2020/0103575 A1 Apr. 2, 2020

(30) Foreign Application Priority Data

Oct. 2, 2018 (JP) .............................. JP2018-187238

(51) Int. Cl.
  *G02B 5/30* (2006.01)
  *G02F 1/1335* (2006.01)
  *G03B 21/00* (2006.01)
  *G03B 33/12* (2006.01)

(52) U.S. Cl.
  CPC ..... *G02B 5/3058* (2013.01); *G02F 1/133528* (2013.01); *G02F 1/133548* (2021.01); *G03B 21/006* (2013.01); *G03B 33/12* (2013.01)

(58) Field of Classification Search
  CPC ......... G02F 1/133528; G02F 1/133548; G02B 5/3058
  See application file for complete search history.

(56) References Cited

U.S. PATENT DOCUMENTS

| 6,122,103 | A | 9/2000 | Perkins et al. | |
| 2005/0275944 | A1 | 12/2005 | Wang et al. | |
| 2005/0277063 | A1 | 12/2005 | Wang et al. | |
| 2011/0170187 | A1* | 7/2011 | Sawaki ............... | G02B 5/3058 359/485.03 |
| 2012/0105745 | A1 | 5/2012 | Kumai | |
| 2013/0286358 | A1* | 10/2013 | Takahashi ............ | G02B 5/3008 353/20 |
| 2014/0063467 | A1 | 3/2014 | Takahashi et al. | |

(Continued)

FOREIGN PATENT DOCUMENTS

| JP | 2003-502708 A | 1/2003 |
| JP | 2007-532977 A | 11/2007 |

(Continued)

*Primary Examiner* — Mariam Qureshi
(74) *Attorney, Agent, or Firm* — Oliff PLC

(57) ABSTRACT

In a process of manufacturing a polarizing element, in a first film forming step, a metal film, a light absorption film, a hard mask, and a resist mask are sequentially formed, and then, in a patterning step, the metal film and the light absorption film are patterned to form a protruded portion provided with a light absorbing portion at a surface side of a metal portion. In a first etching step, dry etching is performed, with the light absorbing portion being an etching mask, to narrow a width of the metal portion. In a second film forming step, a silicon oxide film is formed to cover the protruded portion. In a second etching step, the dry etching is performed on the silicon oxide film, using the light absorbing portion as an etching mask, to leave the silicon oxide film at a side surface of the metal portion.

11 Claims, 13 Drawing Sheets

(56) References Cited

U.S. PATENT DOCUMENTS

| | | | |
|---|---|---|---|
| 2015/0116824 A1 | 4/2015 | Wang et al. | |
| 2015/0116825 A1 | 4/2015 | Wang et al. | |
| 2015/0131150 A1 | 5/2015 | Probst et al. | |
| 2017/0184768 A1 | 6/2017 | Probst et al. | |
| 2018/0059301 A1* | 3/2018 | An | G02F 1/133528 |
| 2018/0180786 A1 | 6/2018 | Takeda | |
| 2018/0299602 A1* | 10/2018 | Takeda | G02B 5/30 |
| 2019/0094438 A1* | 3/2019 | Takada | G02B 5/3058 |

FOREIGN PATENT DOCUMENTS

| | | |
|---|---|---|
| JP | 2012-098469 A | 5/2012 |
| JP | 2012-181420 A | 9/2012 |
| JP | 2013-130598 A | 7/2013 |
| JP | 2014-052439 A | 3/2014 |
| JP | 2014-186181 A | 10/2014 |
| JP | 2015-106149 A | 6/2015 |
| JP | 2016-018143 A | 2/2016 |
| JP | 2016-536651 A | 11/2016 |
| JP | WO2017/073044 A1 | 4/2018 |
| JP | 2018-109754 A | 7/2018 |

\* cited by examiner

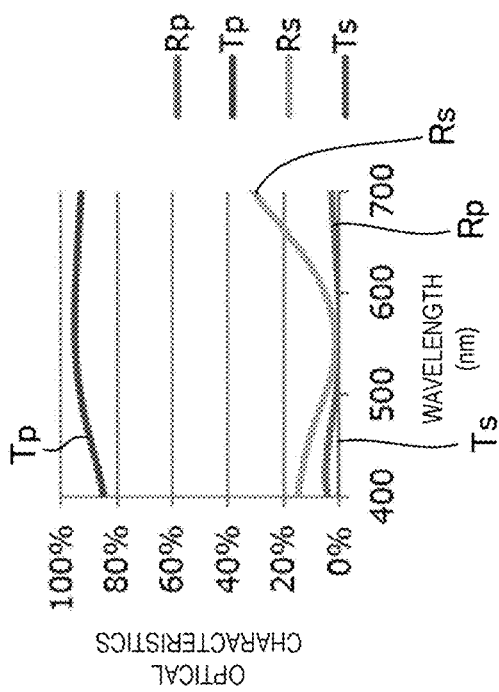
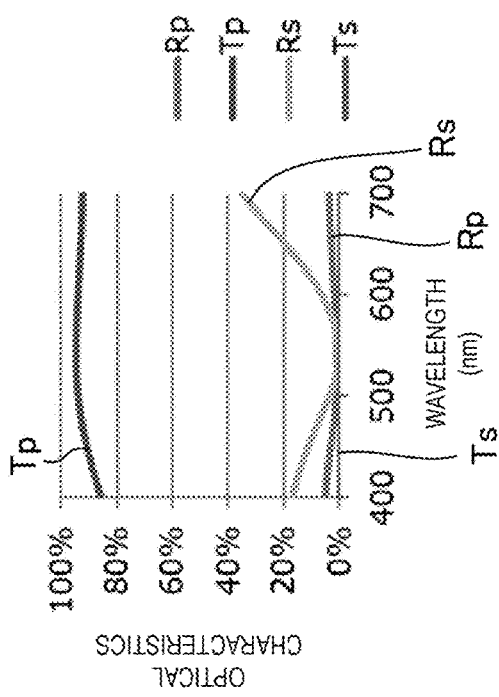

POLARIZING ELEMENT, LIQUID CRYSTAL APPARATUS AND ELECTRONIC APPARATUS

The present application is based on, and claims priority from JP Application Serial Number 2018-187238, filed Oct. 2, 2018, the disclosure of which is hereby incorporated by reference herein in its entirety.

BACKGROUND

1. Technical Field

The present disclosure relates to a polarizing element including a metal portion extending in one direction, a liquid crystal apparatus, and an electronic apparatus.

2. Related Art

A projection-type display apparatus includes a liquid crystal panel, a light source unit that emits light to be supplied to the liquid crystal panel, and a projection optical system that projects light modulated by a light valve. A polarizing element is arranged on an optical path extending from the light source unit, via the liquid crystal panel, to the projection optical system. For such a polarizing element, a polarizing element made of an organic material is frequently used, but the polarizing element made of an organic material has low heat resistance. Thus, the use of a polarizing element provided with a metal layer made of aluminum extending in one direction has been proposed (see WO 2017/073044). WO 2017/073044 describes an aspect in which a side surface of a metal layer made of aluminum is oxidized to provide an oxide layer formed of an aluminum oxide film.

The polarizing element described in WO 2017/073044 is configured such that the side surface of the metal layer is oxidized to cover the side surface of the metal layer, and thus when the metal layer is made of aluminum, the side surface of the metal layer can be covered only with an aluminum oxide film. In this case, there is a problem that, with the aluminum oxide film, sufficient water resistance cannot be obtained, and corrosion of the metal layer due to moisture cannot be prevented.

SUMMARY

In order to solve the above-described problem, an aspect of a polarizing element according to the present disclosure includes a metal portion extending in one direction, a light absorbing portion provided at a tip side of the metal portion in a thickness direction thereof, and a silicon oxide film provided at a side surface of the metal portion, wherein a width of the light absorbing portion is greater than a width of the metal portion in a cross-sectional view, and a sum of a thickness of the silicon oxide film and a width of the metal portion is less than or equal to a width of the light absorbing portion in a cross-sectional view.

In a method for manufacturing a polarizing element according to the present disclosure includes, a first film forming step of forming a metal film and then forming a light absorption film at a surface side of the metal film, a patterning step of patterning the metal film and the light absorption film to form a protruded portion provided with a light absorbing portion at a surface side of a metal portion extending in one direction, a first etching step of performing dry etching, using the light absorbing portion as an etching mask, to narrow a width of the metal portion, a second film forming step of forming a silicon oxide film to cover the protruded portion, and a second etching step of performing dry etching on the silicon oxide film, using the light absorbing portion as an etching mask, to leave the silicon oxide film at a side surface of the metal portion.

The polarizing element according to the present disclosure is provided at at least one of a light incident side and a light emission side of a liquid crystal panel in a liquid crystal apparatus. Such a liquid crystal apparatus is used in an electronic apparatus such as a projection-type display apparatus.

BRIEF DESCRIPTION OF THE DRAWINGS

FIGS. 6A and 6B are explanatory diagrams illustrating optical characteristics of the polarizing element and the like illustrated in FIG. 5.

DESCRIPTION OF EXEMPLARY EMBODIMENTS

Figure 1:
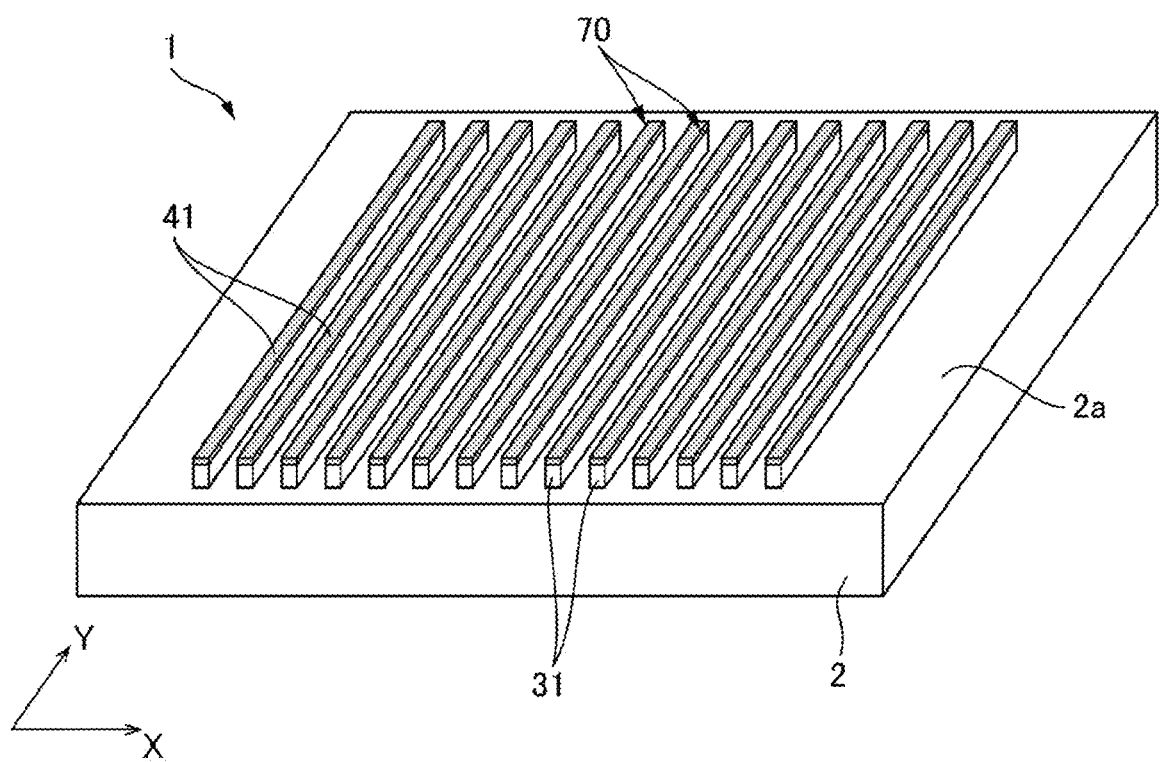
FIG. 1 is an explanatory diagram illustrating an aspect of a polarizing element according to Exemplary Embodiment 1 of the present disclosure.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Further, in descriptions below, a direction in which a metal portion 31 extends is referred to as a Y direction, and a direction in which a plurality of the metal portions 31 are arranged in parallel is referred to as an X direction.

Exemplary Embodiment 1

Configuration of Polarizing Element 1

Figure 2:
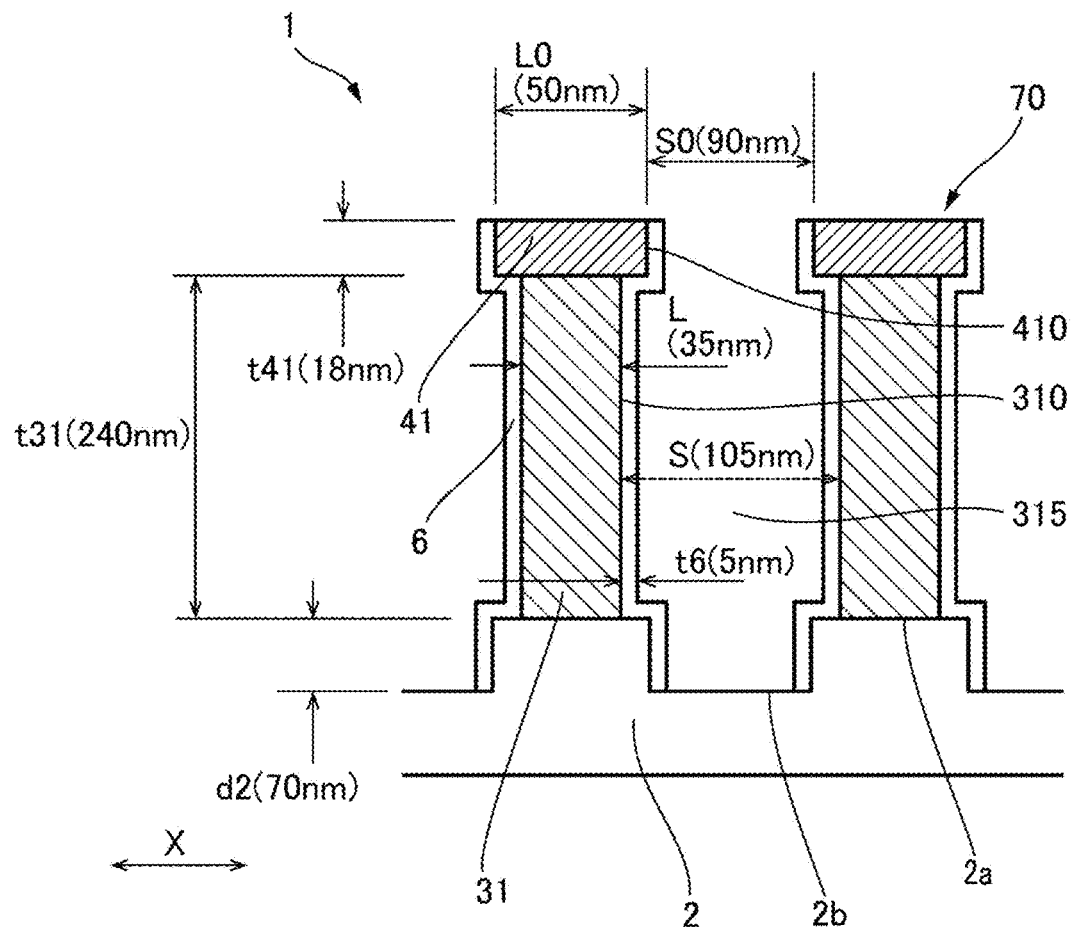
FIG. 2 is a cross-sectional view enlarging and illustrating a metal portion and the like illustrated in FIG. 1.

FIG. 1 is an explanatory diagram illustrating an aspect of a polarizing element 1 according to Exemplary Embodiment 1 of the present disclosure. FIG. 2 is a cross-sectional view enlarging and illustrating the metal portion 31 and the like illustrated in FIG. 1. Note that, in FIG. 1, illustration of a light absorbing portion 41 and a silicon oxide film 6 is omitted. The polarizing element 1 illustrated in FIGS. 1 and 2 is a wire grid polarizing element that includes a substrate 2 having translucency, and a plurality of the metal portions 31 formed on one face 2a of the substrate 2. The plurality of metal portions 31 extend in one direction (Y direction) at an equal pitch to form a wire grid. In the present exemplary embodiment, the plurality of metal portions 31 are arranged in parallel to each other.

The substrate 2 is a translucent substrate such as a glass substrate, a quartz substrate, or a crystal substrate. The substrate 2 is, for example, from 0.5 mm to 0.8 mm in thickness. A width of the metal portion 31, and a space (an interval between the metal portions 31) are less than or equal to 400 nm, for example. In the present exemplary embodiment, the width of the metal portion 31 and the space each are from 20 nm to 300 nm, and a thickness of the metal portion 31 is from 150 nm to 400 nm, for example. The metal portion 31 is made of aluminum, silver, copper, platinum, gold, or alloy containing these metals as a main component. From a viewpoint of keeping an absorption loss in the metal portion 31 small in a visible light wavelength region, a reflective metal such as aluminum, alloy containing aluminum as a main component, silver, or alloy containing silver as a main component is preferably used for the metal portion 31. In the present exemplary embodiment, the metal portion 31 is made of aluminum.

In the polarizing element 1, when a pitch of the metal portion 31 is sufficiently shorter than a wavelength of incident light, then among the incident light, primary linearly polarized light (p-polarized light, TM wave) vibrating in a direction perpendicular to an extending direction of the metal portion 31 is transmitted, and transmission of secondary linearly polarized light (s-polarized light, TE wave) vibrating in the extending direction of the metal layers 31 is inhibited.

As illustrated in FIG. 2, in the polarizing element 1 of the present exemplary embodiment, the light absorbing portion 40 (not illustrated in FIG. 1) including a semiconductor film of silicon, germanium, or the like is formed on an opposite side (a tip side) to the substrate 2 of the metal portion 31. Accordingly, reflection of light incident on the metal portion 31 from the opposite side to the substrate 2 by the metal portion 31 can be suppressed by the light absorbing portion 41. In the present exemplary embodiment, the light absorbing portion 41 is made of silicon and is stacked on an end portion of the metal portion 31 on the opposite side to the substrate 2.

Furthermore, in the polarizing element 1, the silicon oxide film 6 (not illustrated in FIG. 1) is provided on a side surface 310 of the metal portion 31, and the silicon oxide film 6 functions as a water-resistant film or the like that prevents the metal portion 31 from being corroded due to moisture.

In the present exemplary embodiment, in a cross-sectional view, the light absorbing portion 41 has a larger dimension in a width direction (X direction) than that of the metal portion 31 and protrudes toward both sides in the width direction from the side surface 310 of the metal portion 31. Additionally, a sum of a thickness of the silicon oxide film 6 and the width of the metal portion 31 in a cross-sectional view is less than or equal to a width of the light absorbing portion 41. In the present exemplary embodiment, the sum of the thickness of the silicon oxide film 6 and the width of the metal portion 31 is less than the width of the light absorbing portion 41 in a cross-sectional view.

In the present exemplary embodiment, for example, a pitch P between the metal portions 31 is 140 nm, a width L of the metal portion 31 is 35 nm, and a space S between the metal portions 31 is 105 nm. A width L0 of the light absorbing portion 41 is 50 nm, and a space S0 between the light absorbing portions 41 is 90 nm. A thickness t6 of the silicon oxide film 6 is 5 nm. A thickness t31 of the metal portion 31 is 240 nm, and a thickness t41 of the light absorbing portion 41 is 18 nm.

In the present exemplary embodiment, the thickness of the silicon oxide film 6 at a bottom portion of a groove 315 between any one of the metal portions 31 and another metal portion 31 adjacent to the metal portion 31 is less than a thickness at the side surface 310 of the metal portion 31. That is, the thickness of the silicon oxide film 6 at the bottom portion of the groove 315 between the adjacent metal portions 31 is less than the thickness at the side surface 310 of the metal portion 31. In the present exemplary embodiment, the silicon oxide film 6 is not provided at the bottom portion of the groove 315. The bottom portion of the groove 315 between the adjacent metal portions 31 includes a groove portion 2b obtained by etching the one face 2a of the substrate 2 during a patterning step described below. A depth d2 of the groove portion 2b is 70 nm.

In addition, the thickness of the silicon oxide film 6 on an opposite side to the metal portion 31 with respect to the light absorbing portion 41 is less than the thickness at the side surface 310 of the metal portion 31. In the present exemplary embodiment, the silicon oxide film 6 is not provided on the opposite side of the metal portion 31 with respect to the light absorbing portion 41.

Method for Manufacturing Polarizing Element 1

Figure 3:
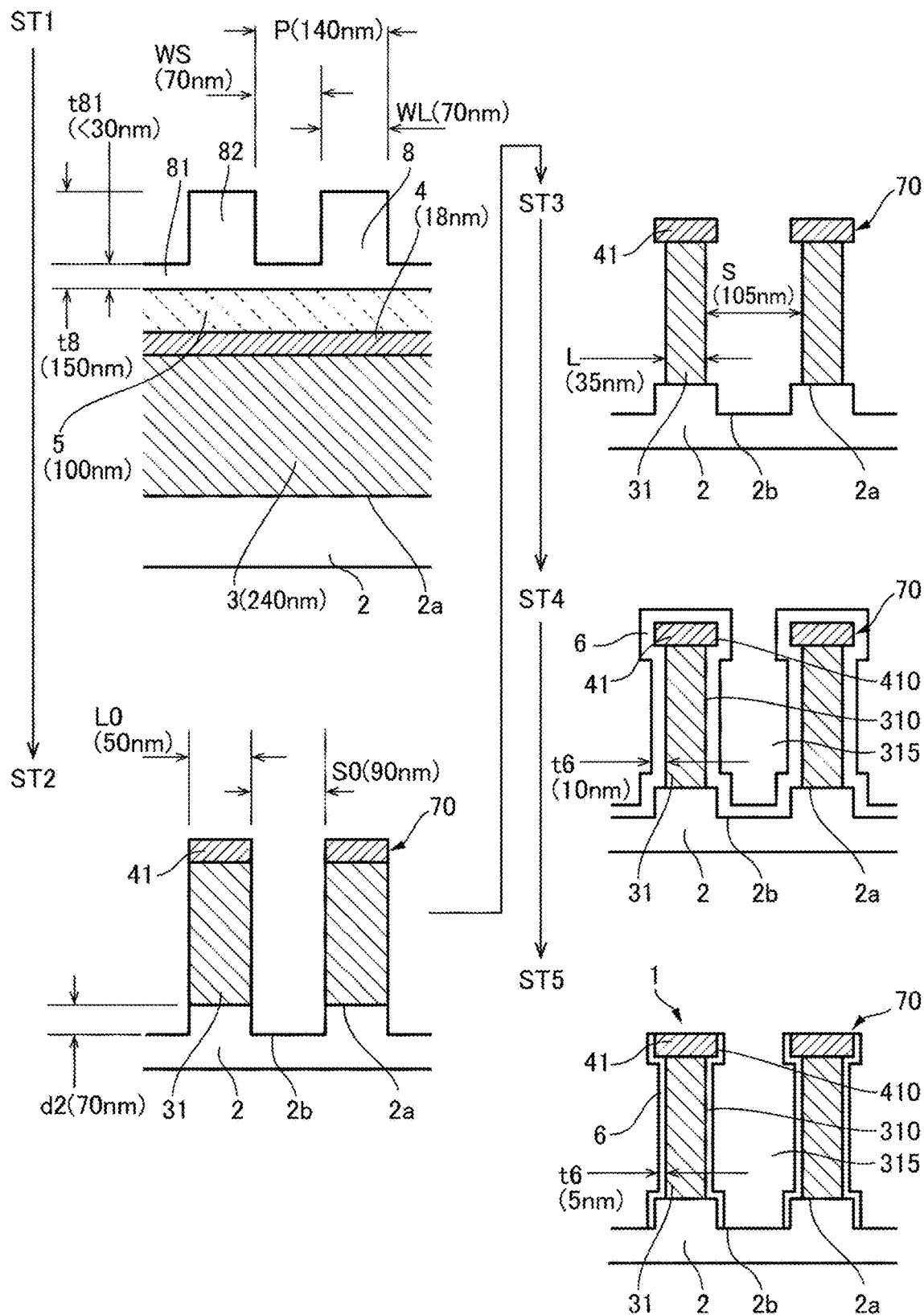
FIG. 3 illustrates, based on cross-sectional views, steps according to an aspect of a method for manufacturing the polarizing element illustrated in FIG. 2.

FIG. 3 illustrates, based on cross-sectional views, steps according to an aspect of a method for manufacturing the polarizing element 1 illustrated in FIG. 2. Note that, in manufacturing the polarizing element 1, steps below are performed for a mother substrate in a state of being larger than the substrate 2, but in descriptions below, the mother substrate will be described as the substrate 2 regardless of the size.

In manufacturing the polarizing element 1 illustrated in FIG. 2, in the present exemplary embodiment, in a first film forming step ST1 illustrated in FIG. 3, after a metal film 3 made of aluminum is formed on the one face 2a of the substrate 2, the light absorption film 4 made of silicon is formed on a surface side of the metal film 3. A thickness of the metal film 3 is 240 nm, and a thickness of the light absorption film 4 is 18 nm.

Next, after a hard mask 5 is formed on a surface of the light absorption film 4, a resist mask 8 is formed on a surface of the hard mask 5. The hard mask 5 is made of a silicon oxide film having a thickness of 100 nm, for example. A portion of the resist mask 8 corresponding to the metal portion 31 illustrated in FIG. 2 is a thick convex portion 82, and a portion corresponding to the groove 315 illustrated in FIG. 2 is a thin concave portion 81. A width WL of the convex portion 82 is 70 nm, and a width WS of the concave portion 81 is 70 nm.

Thus, the pitch P of the convex portion 82 is equal to a pitch of the metal portion 31 illustrated in FIG. 2, and is 140 nm. A thickness t8 of a portion of the resist mask 8 corresponding to the convex portion 82 is 150 nm, and a thickness t81 of a portion of the resist mask 8 corresponding to the concave portion 81 is less than or equal to 30 nm. In forming the resist mask 8, for example, after a resist layer is applied, a mold material for nanoimprint is pressed against the resist layer, and after convexities and concavities of the mold material are transferred to the resist layer, the resist layer is cured.

Next, in a patterning step ST2 illustrated in FIG. 3, the metal film 3 and the light absorption film 4 are patterned to form a protruded portion 70 including the light absorbing portion 41 on a surface side of the metal portion 31 extending in one direction. More specifically, when etching is performed in a state in which the resist mask 8 is formed, a portion of the hard mask 5 that overlaps with the convex portion 82 is left by the resist mask 8, and thus, in subsequent etching, the metal film 3 and the light absorption film 4 are left as the metal portion 31 and the light absorbing portion 41, on the portion overlapping with the convex portion 82. At this point of time, the width L0 of each of the metal portion 31 and the light absorbing portion 41 is 50 nm, and the space S0 between the metal portions 31 and the space S0 between the light absorbing portions 41 is 90 nm.

Next, in a first etching step ST3 illustrated in FIG. 3, dry etching is performed with the light absorbing portion 41 being an etching mask without newly providing an etching mask, and the width L of the metal portion 31 is reduced to 35 nm. At this time, the light absorbing portion 41 is not etched.

Next, in a second film forming step ST4 illustrated in FIG. 3, the silicon oxide film 6 is formed so as to cover the protruded portion 70 including the metal portion 31 and the light absorbing portion 41. The thickness of the silicon oxide film 6 is 10 nm. In the present exemplary embodiment, a film is formed by a Physical Vapor Deposition (PVD) method. In the present exemplary embodiment, the silicon oxide film 6 is formed by an Atomic Layer Deposition (ALD) method.

Next, in a second etching step ST5 illustrated in FIG. 3, the dry etching is performed for the silicon oxide film 6 with the light absorbing portion 41 being an etching mask, without newly providing an etching mask, and removal of the silicon oxide films 6 provided on the bottom portion of the groove 315 between the adjacent metal portions 31, and on the opposite side of the metal portion 31 from the light absorbing portion 41 is performed. In the present exemplary embodiment, the silicon oxide films 6 provided on the bottom portion of the groove 315 between adjacent metal portions 31, and on the opposite side to the metal portion 31 with respect to the light absorbing portion 41 are completely removed. As a result, the silicon oxide film 6 having the thickness t6 of 5 nm is left on the side surface 310 of the metal portion 31 located behind the light absorbing portion 41. Additionally, the silicon oxide films 6 having the thickness t6 of 5 nm are left also on a surface of the light absorbing portion 41 on a side of the substrate 2, on an inner wall of the groove 2b of the substrate 2, and on a side surface 410 of the light absorbing portion 41.

Thereafter, the substrate 2 is divided into a plurality of the polarizing elements 1 having a single-item size to obtain the polarizing element 1 illustrated in FIG. 2.

Optical Characteristics

Figure 4A:
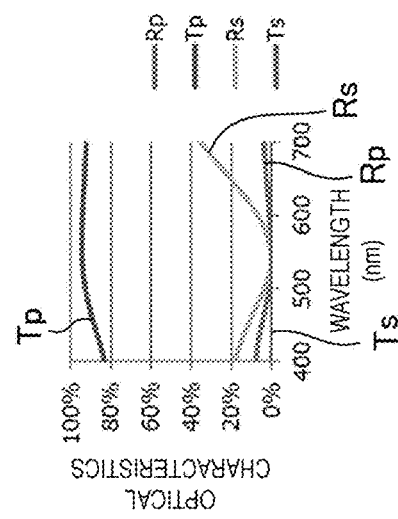
FIGS. 4A to 4C are explanatory diagrams illustrating optical characteristics of the polarizing element and the like illustrated in FIG. 2.
Figure 4B:
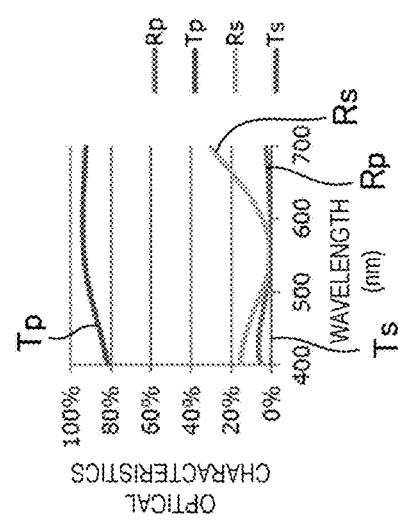
Figure 4C:
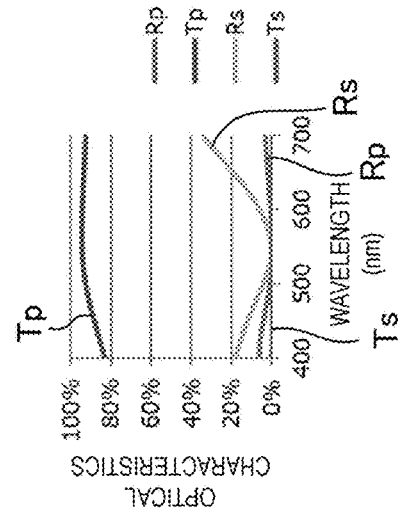

FIGS. 4A to 4C are explanatory diagrams illustrating optical characteristics of the polarizing element 1 and the like illustrated in FIG. 2, and FIGS. 4A to 4C illustrate, as optical characteristics, reflectivity Rp of p-polarized light, transmittance Tp of the p-polarized light and reflectivity Rs of s-polarized light, and, as frequency characteristics, transmittance Ts of the s-polarized light. Also, FIGS. 4A to 4C illustrate optical characteristics A of the polarizing element 1 at a point of time when the first etching step ST3 in FIG. 3 ends, optical characteristics B of the polarizing element 1 at a point of time when the second film forming step ST4 in FIG. 3 ends, and optical characteristics C of the polarizing element 1 at a point of time when the second etching step ST5 in FIG. 3 ends, respectively. In addition, all of the transmittance TP of the p-polarized light, a contrast ratio CR, and the reflectivity Rs of the s-polarized light described below are average values for light having a wavelength ranging from 500 nm to 590 nm. A larger value of the contrast ratio CR is preferable. In addition, in the present exemplary embodiment, the transmittance Tp of the p-polarized light is preferably larger, and a value of the reflectivity Rs of the s-polarized light is preferably smaller.

At the point of time when the first etching step ST3 in FIG. 3 ends, the polarizing element 1 has the optical characteristics A illustrated in FIG. 4A. The transmittance Tp of the p-polarized light is 94.1%, the contrast ratio CR is 5690, and the reflectivity Rs of the s-polarized light is 1.9%.

At the point of time when the second film forming step ST4 in FIG. 3 ends, the polarizing element 1 has the optical characteristics B illustrated in FIG. 4B. The transmittance Tp of the p-polarized light is 93.1%, the contrast ratio CR is 4290, and the reflectivity Rs of the s-polarized light is 2.5%. In other words, before and after the silicon oxide film 6 is formed on an entire surface of the polarizing element 1, the transmittance Tp of p-polarized light and the contrast ratio CR lower, and the reflectivity Rs of s-polarized light rises.

At the point of time when the second etching step ST5 in FIG. 3 ends, the polarizing element 1 has the optical characteristics C illustrated in FIG. 4C. The transmittance Tp of the p-polarized light is 94.1%, the contrast ratio CR is 4850, and the reflectivity Rs of the s-polarized light Rs is 1.9%. That is, before and after removing the silicon oxide film 6 that is unnecessary, the transmittance Tp of the p-polarized light and the contrast ratio CR rise, and the reflectivity Rs of the s-polarized light drops.

Reference Example

Figure 5:
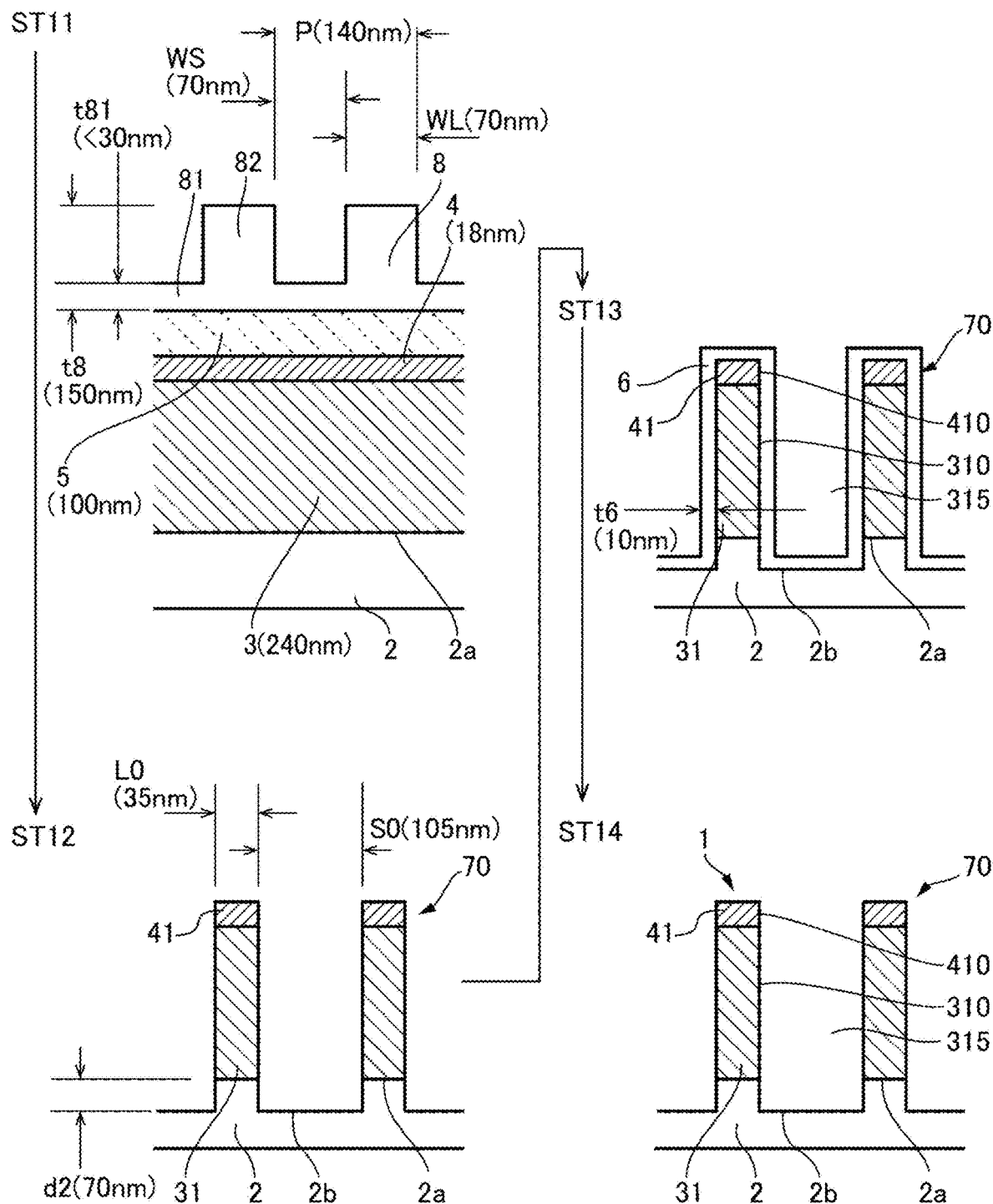
FIG. 5 is an explanatory diagram of a polarizing element according to a reference example of the present disclosure.

FIG. 5 is an explanatory diagram of the polarizing element 1 according to a reference example of the present disclosure. Note that, among the components illustrated in FIG. 5, portions corresponding to the components of Exemplary Embodiment 1 of the present disclosure described with reference to FIGS. 2 and 3 are given identical reference signs, and descriptions thereof will be omitted. FIGS. 6A and 6B are explanatory diagrams illustrating optical characteristics of the polarizing element 1 and the like illustrated in FIG. 5, and FIGS. 6A and 6B illustrate optical characteristics A of the polarizing element 1 at a point of time when a patterning step ST12 in FIG. 5 ends, and optical characteristics B of the polarizing element 1 at a point of time when a film forming step ST13 in FIG. 5 ends, respectively.

In the reference example of the present disclosure, in a film forming step ST11 illustrated in FIG. 5, after the metal film 3 is formed on the one face 2a of the substrate 2, the light absorption film 4 is formed on the surface side of the metal film 3. Next, after the hard mask 5 is formed on a surface of the light absorption film 4, the resist mask 8 is formed on a surface of the hard mask 5.

Next, in the patterning step ST12 illustrated in FIG. 5, the metal film 3 and the light absorption film 4 are patterned to form the protruded portion 70 including the light absorbing portion 41 on the surface side of the metal portion 31 extending in the one direction. At this point of time, the width L0 of each of the metal portion 31 and the light absorbing portion 41 is 35 nm, and the space S0 between the metal portions 31 and the space S0 between the light absorbing portions 41 is 105 nm.

Next, in the film forming step ST13 illustrated in FIG. 5, the silicon oxide film 6 is formed so as to cover the protruded portion 70. The thickness of the silicon oxide film 6 is 10 nm.

With the above-described configuration, when the silicon oxide film 6 that is in excess is removed in an etching step ST14 illustrated in FIG. 5, the light absorbing portion 41 does not function as an etching mask for the silicon oxide film 6, and thus the silicon oxide film 6 is removed from the side surface 310 of the metal portion 31. As a result, the state in which the patterning step ST12 illustrated in FIG. 5 ends is to be resumed.

At the point of time when the patterning step ST12 in FIG. 5 ends, the polarizing element 1 has optical characteristics A illustrated in FIG. 6A. The transmittance Tp of the p-polarized light is 92.4%, the contrast ratio CR is 5300, and the reflectivity Rs of the s-polarized light is 3.0%.

At the point of time when the film forming step ST13 in FIG. 5 ends, the polarizing element 1 has optical characteristics B illustrated in FIG. 6B. The transmittance Tp of the p-polarized light is 91.9%, the contrast ratio CR is 4300, and the reflectivity Rs of the s-polarized light is 3.6%. In other words, before and after the silicon oxide film 6 is formed on the entire surface of the polarizing element 1, the contrast ratio CR drops, and the reflectivity Rs of s-polarized light rises. The transmittance Tp of the p-polarized light is unchanged.

Main Effects of Exemplary Embodiment

In this way, in the aspect illustrated in the reference example, in order to cover the side surface 310 of the metal portion 31 with the silicon oxide film 6, the silicon oxide film 6 is formed on the entire surface of the polarizing element 1, and thus the optical characteristics drop. Thus, when the optical characteristics in the case where the silicon oxide film 6 is formed in the reference example is compared with the optical characteristics in the case where the silicon oxide film 6 is formed in Exemplary Embodiment 1 of the present disclosure, the transmittance Tp of the p-polarized light and the contrast ratio CR are high, and the reflectivity Rs of s-polarized light is low in the case where the silicon oxide film 6 is formed in Exemplary Embodiment 1 in the present disclosure. Thus, according to the present exemplary embodiment, by providing the silicon oxide film 6 on the side surface 310 of the metal portion 31, excellent optical characteristics are exhibited even when corrosion of the metal portion 31 due to moisture is prevented. In addition, according to the present exemplary embodiment, since the silicon oxide film 6 is a film formed in the second film forming step ST4, the silicon oxide film 6 can be provided on the side surface 310 of the metal portion 31 regardless of a material configuring the metal portion 31.

Exemplary Embodiment 2

Figure 7:
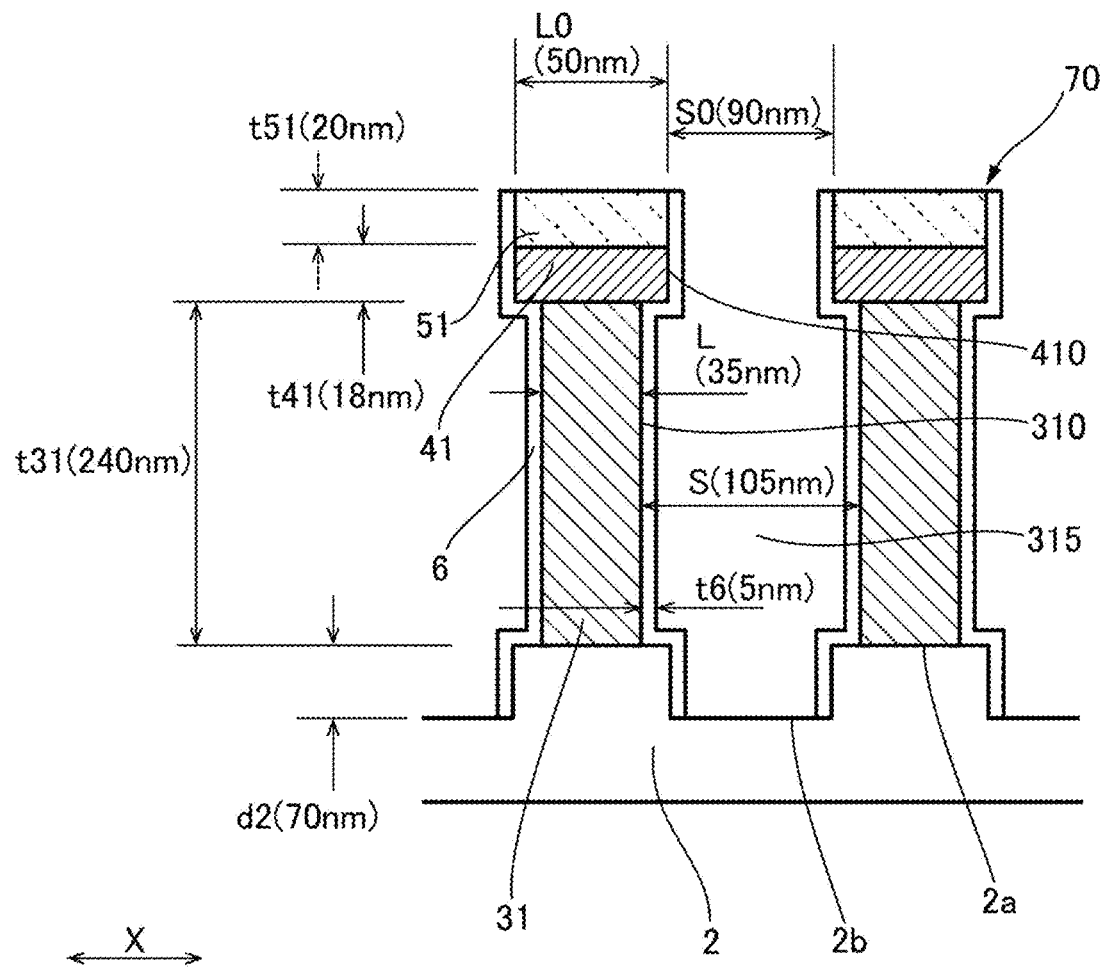
FIG. 7 is an explanatory diagram of a polarizing element according to Exemplary Embodiment 2 of the present disclosure.
Figure 8:
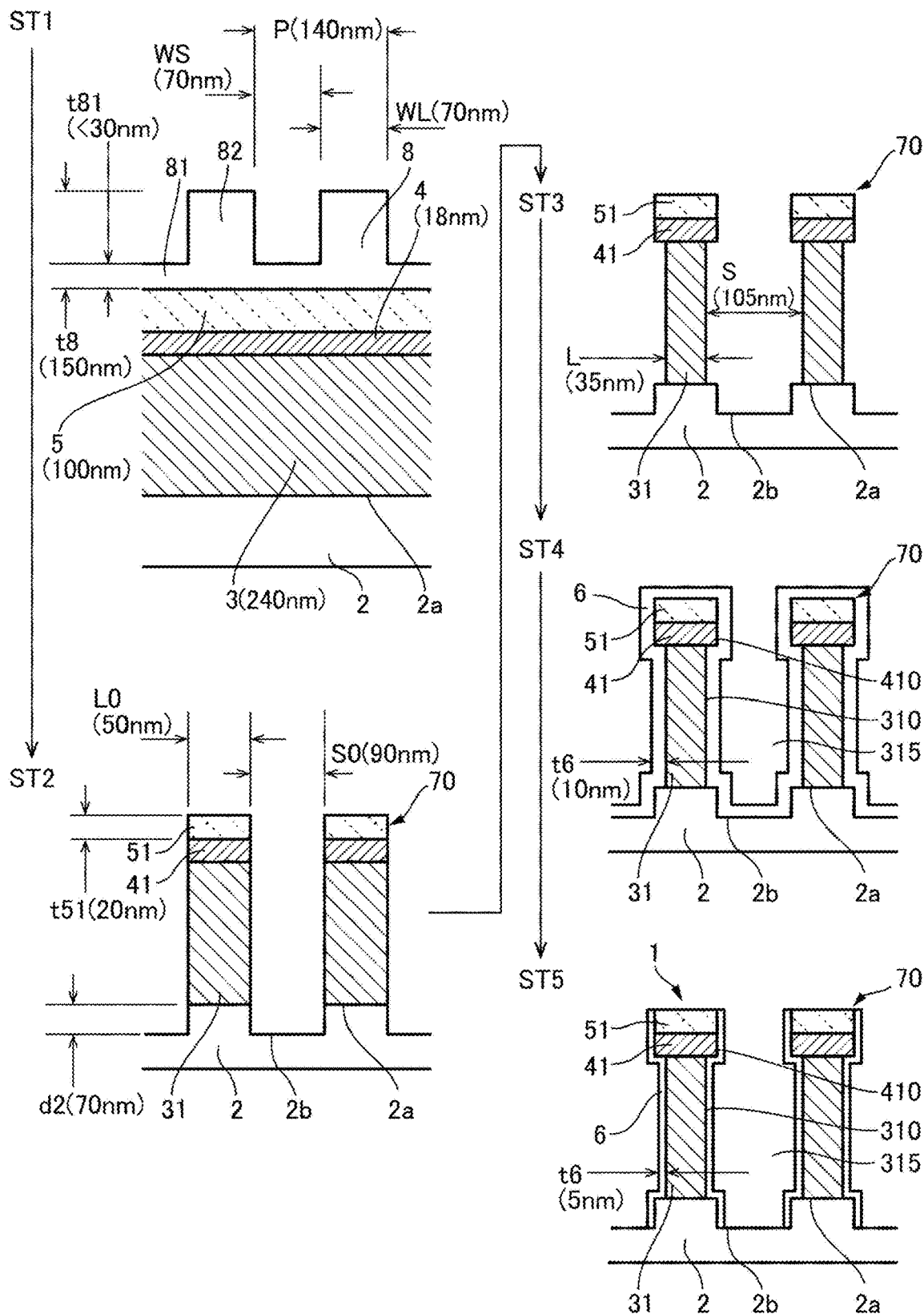
FIG. 8 illustrates, based on cross-sectional views, steps according to an aspect of a method for manufacturing the polarizing element illustrated in FIG. 7.
Figure 9A:
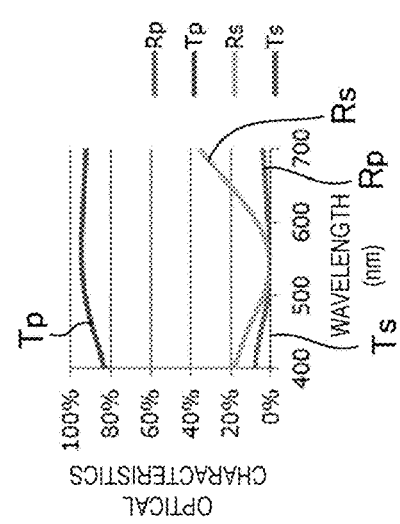
FIGS. 9A to 9C are explanatory diagrams illustrating optical characteristics of the polarizing element and the like illustrated in FIG. 7.
Figure 9B:
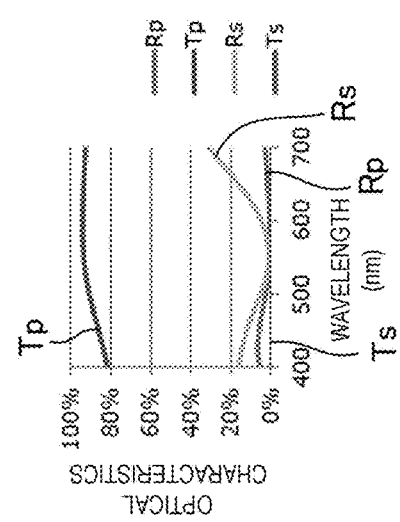
Figure 9C:
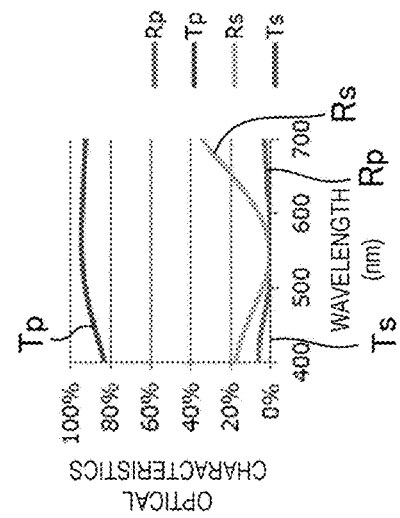

FIG. 7 is an explanatory diagram of the polarizing element 1 according to Exemplary Embodiment 2 of the present disclosure, and is a cross-sectional view enlarging and illustrating the metal portion 31 and the like. FIG. 8 illustrate, based on cross-sectional views, steps according to an aspect of a method for manufacturing the polarizing element 1 illustrated in FIG. 7. FIGS. 9A to 9C are explanatory diagrams illustrating optical characteristics of the polarizing element 1 and the like illustrated in FIG. 7, and FIGS. 9A to 9C illustrate optical characteristics A of the polarizing element 1 at a point of time when the first etching step ST3 in FIG. 8 ends, optical characteristics B of the polarizing element 1 at a point of time when the second film forming step ST4 in FIG. 8 ends, and optical characteristics C of the polarizing element 1 at a point of time when the second etching step ST5 in FIG. 8 ends, respectively. Note that, basic configurations in this exemplary embodiment are similar to those in Exemplary Embodiment 1, and thus common portions are assigned identical reference signs and a description thereof will be omitted.

Similar to Exemplary Embodiment 1, the polarizing element 1 illustrated in FIG. 7 is also a wire grid polarizing element including the substrate 2 having translucency and the plurality of metal portions 31 formed on the one face 2a of the substrate 2. In the polarizing element 1, the light absorbing portion 41 made of a semiconductor film such as silicon or germanium is formed on the opposite side (tip side) to the substrate 2 of the metal portion 31, and the silicon oxide film 6 is provided on the side surface 310 of the metal portion 31. In the present exemplary embodiment as well, similar to Exemplary Embodiment 1, the sum of the thickness of the silicon oxide film 6 and the width of the metal portion 31 is less than or equal to the width of the light absorbing portion 41 in a cross-sectional view. Furthermore, the silicon oxide film 6 is provided neither on the bottom portion of the groove 315, nor on the opposite side to the metal portion 31 with respect to the light absorbing portion 41.

In the present exemplary embodiment, a balance 51 of the hard mask 5 remains on the opposite side to the metal portions 31 with respect to the light absorbing portion 41. The balance 51 of the hard mask 5 is a silicon oxide film having a thickness t51 of 20 nm.

In manufacturing the polarizing element 1 illustrated in FIG. 7, in the present exemplary embodiment, in the first film forming step ST1 illustrated in FIG. 8, after the metal film 3 is formed on the one face 2a of the substrate 2, the light absorption film 4 is formed on the surface side of the metal film 3. The thickness of the metal film 3 is 240 nm, and the thickness of the light absorption film 4 is 18 nm. Next, after the hard mask 5 is formed on a surface of the light absorption film 4, the resist mask 8 is formed on a surface of the hard mask 5. The hard mask 5 is made of a silicon oxide film having a thickness of 100 nm, for example.

Next, in the patterning step ST2 illustrated in FIG. 8, the metal film 3 and the light absorption film 4 are patterned to form the protruded portion 70 including the light absorbing portion 41 on the surface side of the metal portion 31 extending in the one direction. At this point of time, the width L0 of each of the metal portion 31 and the light absorbing portion 41 is 50 nm, and the space S0 between the metal portions 31 and the space S0 between the light absorbing portions 41 is 90 nm. Additionally, the balance 51 of the hard mask 5 remains on the opposite side to the metal portions 31 with respect to the light absorbing portion 41. The balance 51 of the hard mask 5 is a silicon oxide film having the thickness t51 of 20 nm.

Next, in the first etching step ST3 illustrated in FIG. 8, the dry etching is performed with the light absorbing portion 41 and the balance 51 of the hard mask 5 being an etching mask without newly providing an etching mask, and the width L of the metal portion 31 is reduced to 35 nm. At this time, the light absorbing portion 41 and the balance 51 of the hard mask 5 are not etched.

Next, in the second film forming step ST4 illustrated in FIG. 8, the silicon oxide film 6 is formed so as to cover the protruded portion 70 including the metal portion 31 and the light absorbing portion 41.

Next, in the second etching step ST5 illustrated in FIG. 8, the dry etching is performed for the silicon oxide film 6 with the light absorbing portion 41 and the balance 51 of the hard mask 5 being an etching mask without newly providing an etching mask, and the complete removal of the silicon oxide films 6 provided on the bottom portion of the groove 315 between the adjacent metal portions 31, and on the opposite side of the metal portion 31 from the light absorbing portion 41 is performed. As a result, the silicon oxide film 6 having the thickness t6 of 5 nm is left on the side surface 310 of the metal portion 31 positioned behind the light absorbing portion 41. Additionally, the silicon oxide films 6 having the thickness t6 of 5 nm are left also on a surface of the light absorbing portion 41 on a side of the substrate 2, on an inner wall of the groove 2b of the substrate 2, on the side surface 410 of the light absorbing portion 41, and on a side surface of the balance 51 of the hard mask 5. Thereafter, the substrate 2 is divided into a plurality of the polarizing elements 1 having a single-item size to obtain the polarizing element 1 illustrated in FIG. 7.

At the point of time when the first etching step ST3 in FIG. 8 ends, the polarizing element 1 has optical characteristics A illustrated in FIG. 9A. The transmittance Tp of the p-polarized light is 94.1%, the contrast ratio CR is 5830, and the reflectivity Rs of the s-polarized light Rs is 2.3%.

At the point of time when the second film forming step ST4 in FIG. 8 ends, the polarizing element 1 has optical characteristics B illustrated in FIG. 9B. The transmittance Tp of the p-polarized light is 92.8%, the contrast ratio CR is 4390, and the reflectivity of the s-polarized light Rs is 3.9%. In other words, before and after the silicon oxide film 6 is formed on an entire surface of the polarizing element 1, the transmittance Tp of p-polarized light and the contrast ratio CR drops, and the reflectivity Rs of s-polarized light rises.

At the point of time when the second etching step ST5 in FIG. 8 ends, the polarizing element 1 has optical characteristics C illustrated in FIG. 9C. The transmittance Tp of the p-polarized light is 94.0%, the contrast ratio CR is 4980, and the reflectivity Rs of the s-polarized light Rs is 2.7%. That is, before and after removing the silicon oxide film 6 that is unnecessary, the transmittance Tp of the p-polarized light and the contrast ratio CR rise, and the reflectivity Rs of the s-polarized light drops.

Exemplary Embodiment 3

Figure 10:
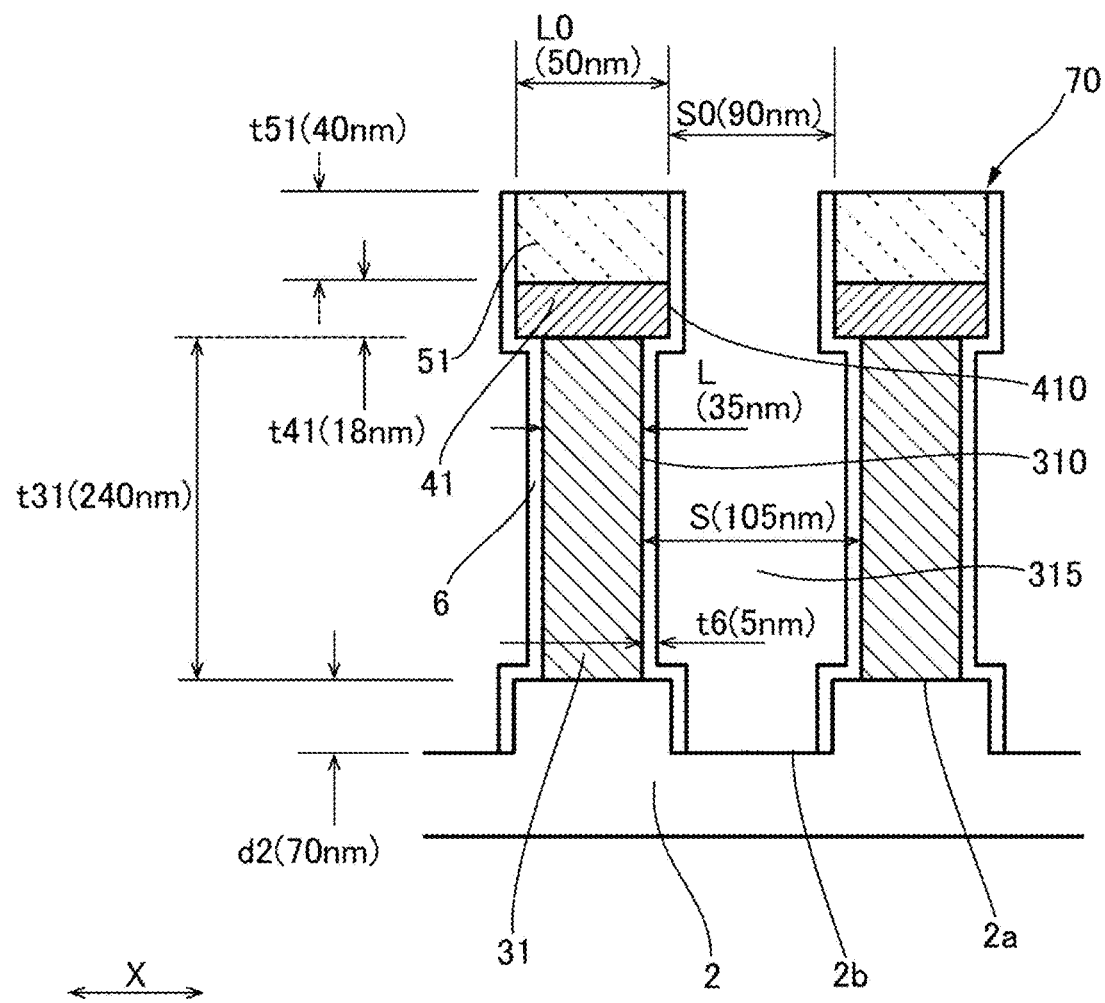
FIG. 10 is an explanatory diagram of a polarizing element according to Exemplary Embodiment 3 of the present disclosure.
Figure 11:
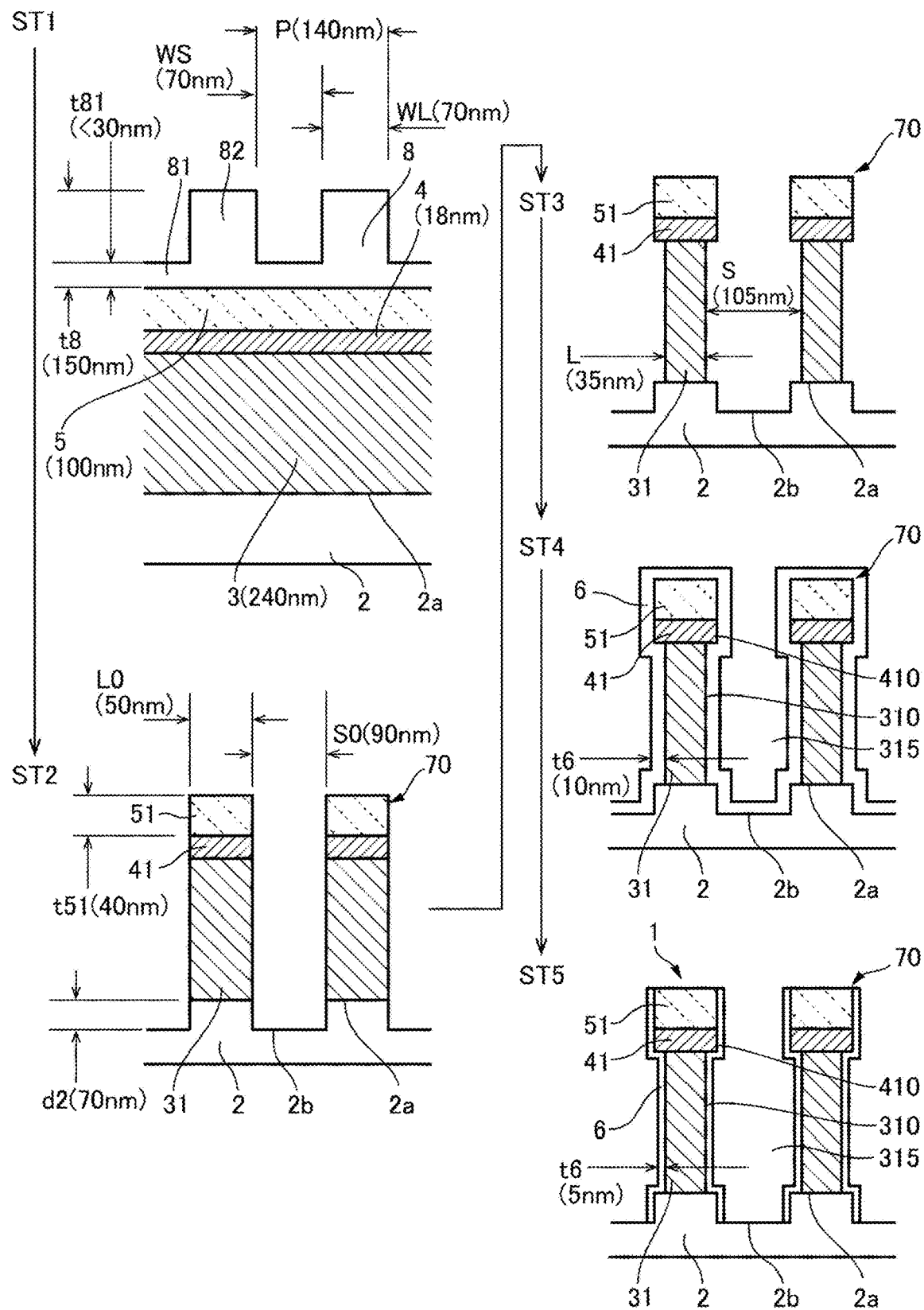
FIG. 11 illustrates, based oncross-sectional views, steps according to an aspect of a method for manufacturing the polarizing element illustrated in FIG. 10.
Figure 12A:
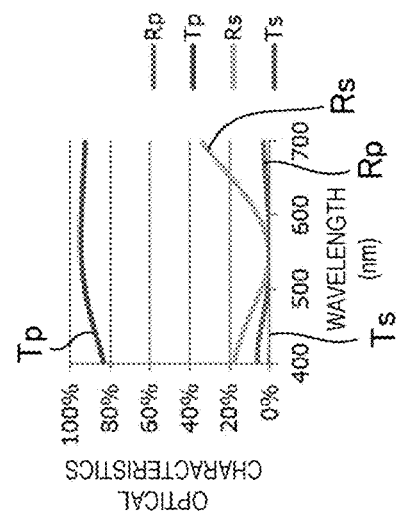
FIGS. 12A to 12C are explanatory diagrams illustrating optical characteristics of the polarizing element and the like illustrated in FIG. 10.
Figure 12B:
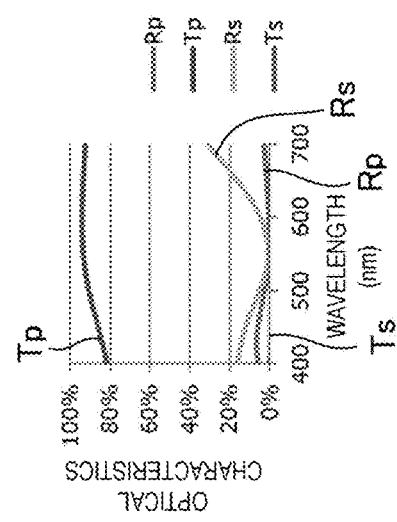
Figure 12C:
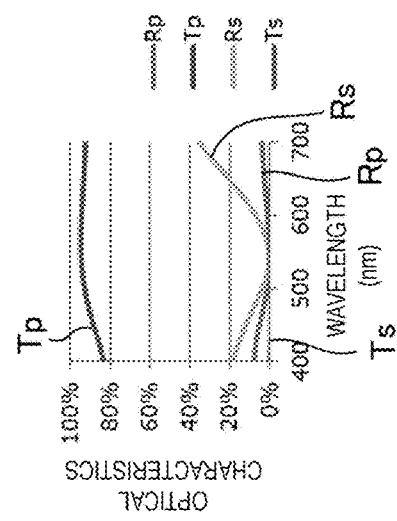

FIG. 10 is an explanatory diagram of the polarizing element 1 according to Exemplary Embodiment 3 of the present disclosure, and is a cross-sectional view enlarging and illustrating the metal portion 31 and the like. FIG. 11 illustrates, based oncross-sectional views, steps according to an aspect of a method for manufacturing the polarizing element 1 illustrated in FIG. 10. FIGS. 12A to 12C are explanatory diagrams illustrating optical characteristics of the polarizing element 1 and the like illustrated in FIG. 10, and FIGS. 12A to 12C illustrate optical characteristics A of the polarizing element 1 at a point of time when the first etching step ST3 in FIG. 11 ends, optical characteristics B of the polarizing element 1 at a point of time when the second film forming step ST4 in FIG. 11 ends, and optical characteristics C of the polarizing element 1 at a point of time when the second etching step ST5 in FIG. 11 ends, respectively. Note that, basic configurations in this exemplary embodiment are similar to those in Exemplary Embodiment 1, and thus, common portions are assigned identical reference signs and a description thereof will be omitted.

Similar to Exemplary Embodiments 1 and 2, the polarizing element 1 illustrated in FIG. 10 is also a wire grid polarizing element including the substrate 2 having translucency and the plurality of metal portions 31 formed on the one face 2a of the substrate 2. In the polarizing element 1, the light absorbing portion 41 made of a semiconductor film such as silicon or germanium is formed on the opposite side (tip side) to the substrate 2 of the metal portion 31, and the silicon oxide film 6 is provided on the side surface 310 of the metal portion 31. In the present exemplary embodiment as well, similar to Exemplary Embodiment 1, the sum of the thickness of the silicon oxide film 6 and the width of the metal portion 31 is less than or equal to the width of the light absorbing portion 41 in a cross-sectional view. Furthermore, the silicon oxide film 6 is provided neither on the bottom portion of the groove 315, nor on the opposite side to the metal portion 31 with respect to the light absorbing portion 41.

In the present exemplary embodiment, similar to Exemplary Embodiment 2, the balance 51 of the hard mask 5 remains on the opposite side to the metal portions 31 with respect to the light absorbing portion 41. The balance 51 of the hard mask 5 is a silicon oxide film having the thickness t51 of 40 nm.

In manufacturing the polarizing element 1 illustrated in FIG. 10, in the present exemplary embodiment, in the first film forming step ST1 illustrated in FIG. 11, after the metal film 3 is formed on the one face 2a of the substrate 2, the light absorption film 4 is formed on the surface side of the metal film 3. The thickness of the metal film 3 is 240 nm, and the thickness of the light absorption film 4 is 18 nm. Next, after the hard mask 5 is formed on a surface of the light absorption film 4, the resist mask 8 is formed on a surface of the hard mask 5. The hard mask 5 is made of a silicon oxide film having a thickness of 100 nm, for example.

Next, in the patterning step ST2 illustrated in FIG. 11, the metal film 3 and the light absorption film 4 are patterned to form the protruded portion 70 including the light absorbing portion 41 on the surface side of the metal portion 31 extending in the one direction. At this point of time, the width L0 of each of the metal portion 31 and the light absorbing portion 41 is 50 nm, and the space S0 between the metal portions 31 and the space S0 between the light absorbing portions 41 is 90 nm. Additionally, the balance 51 of the hard mask 5 remains on the opposite side to the metal portions 31 with respect to the light absorbing portion 41. The balance 51 of the hard mask 5 is a silicon oxide film having the thickness t51 of 40 nm.

Next, in the first etching step ST3 illustrated in FIG. 11, the dry etching is performed with the light absorbing portion 41 and the balance 51 of the hard mask 5 being an etching mask without newly providing an etching mask, and the width L of the metal portion 31 is reduced to 35 nm. At this time, the light absorbing portion 41 and the balance 51 of the hard mask 5 are not etched.

Next, in the second film forming step ST4 illustrated in FIG. 11, the silicon oxide film 6 is formed so as to cover the protruded portion 70 including the metal portion 31 and the light absorbing portion 41.

Next, in the second etching step ST5 illustrated in FIG. 11, the dry etching is performed for the silicon oxide film 6 with the light absorbing portion 41 and the balance 51 of the hard mask 5 being an etching mask, without newly providing an etching mask, and the complete removal of the silicon oxide films 6 provided on the bottom portion of the groove 315 between the adjacent metal portions 31, and on the opposite side of the metal portion 31 from the light absorbing portion 41 is performed. As a result, the silicon oxide film 6 having the thickness t6 of 5 nm is selectively left on the side surface 310 of the metal portion 31 positioned behind the light absorbing portion 41. Additionally, the silicon oxide films 6 having the thickness t6 of 5 nm are left also on a surface of the light absorbing portion 41 on a side of the substrate 2, on an inner wall of the groove 2b of the substrate 2, on the side surface 410 of the light absorbing portion 41, and on a side surface of the balance 51 of the hard mask 5. Thereafter, the substrate 2 is divided into a plurality of the polarizing elements 1 having a single-item size to obtain the polarizing element 1 illustrated in FIG. 7.

At the point of time when the first etching step ST3 in FIG. 11 ends, the polarizing element 1 has optical characteristics A illustrated in FIG. 12A. The transmittance Tp of the p-polarized light is 93.9%, the contrast ratio CR is 5910, and the reflectivity of the s-polarized light Rs is 3.1%.

At the point of time when the second film forming step ST4 in FIG. 11 ends, the polarizing element 1 has optical characteristics B illustrated in FIG. 12B. The transmittance Tp of the p-polarized light is 92.7%, the contrast ratio CR is 4480, and the reflectivity Rs of the s-polarized light Rs is 5.4%. In other words, before and after the silicon oxide film 6 is formed on an entire surface of the polarizing element 1, the transmittance Tp of p-polarized light and the contrast ratio CR drop, and the reflectivity Rs of s-polarized light rises.

At the point of time when the second etching step ST5 in FIG. 11 ends, the polarizing element 1 has optical characteristics C illustrated in FIG. 12C. The transmittance Tp of the p-polarized light is 93.9%, the contrast ratio CR is 5080, and the reflectivity of the s-polarized light Rs is 3.8%. That is, before and after removing the silicon oxide film 6 that is unnecessary, the transmittance Tp of the p-polarized light and the contrast ratio CR rise, and the reflectivity Rs of the s-polarized light drops.

Other Exemplary Embodiments

In the exemplary embodiments described above, in the second etching step ST5, the silicon oxide films 6 provided on the bottom portion of the groove 315 between the adjacent metal portions 31, and on the opposite side to the metal portion 31 with respect to the light absorbing portion 41 are completely removed, but the silicon oxide films 6 may be left on the bottom portion of the groove 315 between the adjacent metal portions 31, and on the opposite side to the metal portion 31 with respect to the light absorbing portion 41. In this case, the silicon oxide films 6 remain on the bottom portion of the groove 315 between adjacent metal portions 31, and on the opposite side to the metal portion 31 with respect to the light absorbing portion 41, with a thickness less than the thickness in the side surface 310 of the metal portion 31.

Although in the exemplary embodiments described above, the light absorbing portion 41 is provided on the end portion of metal portion 31, the present disclosure may be applied when a dielectric layer or the like is provided between the metal portion 31 and the light absorbing portion 41.

Configuration Examples of Projection-type Display Apparatus

Figure 13:
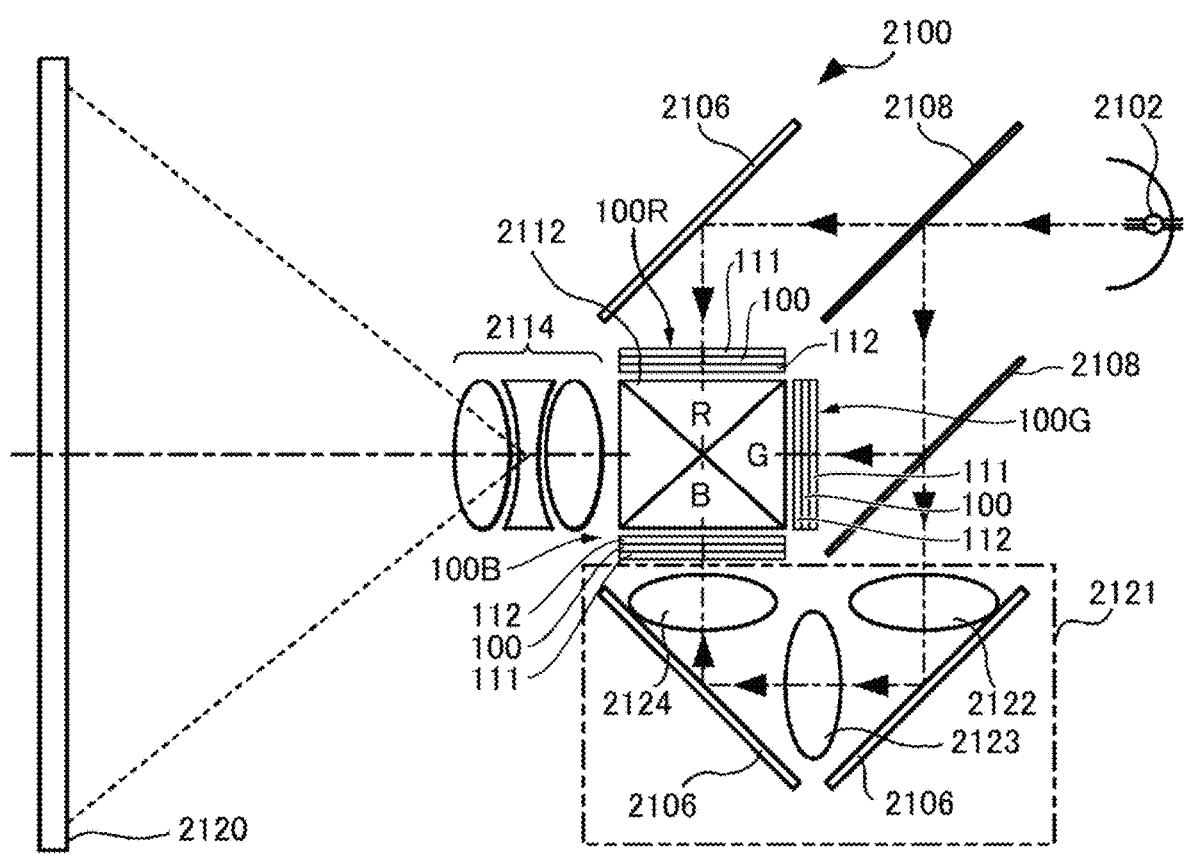
FIG. 13 is an explanatory diagram of a projection-type display apparatus using a transmission type liquid crystal panel.

A projection-type display apparatus (liquid crystal projector) as an example of an electronic apparatus using the polarizing element 1 according to the exemplary embodiments described above will be described. FIG. 13 is an explanatory view of a projection-type display apparatus using a transmission type liquid crystal panel. A projection-type display apparatus 2100 illustrated in FIG. 13 is provided with liquid crystal panels 100 for respective colors, a light source unit that emits light to be supplied to the liquid crystal panels 100, and a projection optical system that projects light modulated by the liquid crystal panel, and the polarizing element 1 applied with the present disclosure is arranged on an optical path reaching the projection optical system from the light source unit, via the liquid crystal panel. In the present exemplary embodiment, each of liquid crystal apparatuses 100R, 100G, and 100B for the respective colors as light valves includes an incident side polarized light separation element 111 on a light incident side and an emission-side polarized light separation element 112 on a light emission side of the liquid crystal panel 100, and at least one of the incident side polarized light separation element 111 and the emission side polarized light separation element 112 is the polarizing element 1 applied with the present disclosure.

The projection-type display apparatus 2100 illustrated in FIG. 13 is provided with a lamp unit 2102 (light source unit) with a white light source such as a halogen lamp. Projection light emitted from the lamp unit 2102 is split into three primary colors of R (red), G (green), and B (blue) by three mirrors 2106 and two dichroic mirrors 2108 installed inside. The split projection light is guided to the liquid crystal apparatuses 100R, 100G, and 100B corresponding to the primary colors respectively, and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color. The liquid crystal apparatuses 100R, 100G, and 100B each include the incident-side polarized light separation element 111 overlapping, on an incident side, with the liquid crystal panel 100, and the emission-side polarized light separation element 112 overlapping, on an emission side, with the liquid crystal panel 100.

The light modulated by each of the liquid crystal apparatuses 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, an image of the primary colors is synthesized, and subsequently a color image is projected on a screen 2120 by a projection lens group 2114 (projection optical system).

Other Projection-Type Display Apparatuses

A projection-type display apparatus may be configured to use, as a light source unit, an LED light source configured to emit light in various colors, and the like to supply light in various colors emitted from the LED light source to another liquid crystal apparatus. In the projection-type display apparatus 2100 illustrated in FIG. 13, the transmission type liquid crystal panels 100 are used for the liquid crystal apparatuses 100R, 100G, and 100B. However, in a projection-type display apparatus using a reflection type liquid crystal panel, the polarizing element 1 described with reference to FIGS. 1 through 12A to 12C may be arranged on an optical path extending from a light source unit, via a liquid crystal panel, to a projection optical system. In addition, the polarizing element 1 to which the present disclosure is applied may be used in a polarizing element used in a projection-type display apparatus that displays a color image by one liquid crystal apparatus.

Other Electronic Apparatuses

An electronic apparatus including the polarizing element 1 to which the present disclosure is applied is not limited to the projection-type display apparatus 2100 of the above-described exemplary embodiment. Examples of the electronic apparatus may include a projection-type Head Up Display (HUD), a direct-view type Head Mounted Display (HMD), a personal computer, a digital still camera, and a liquid crystal television, and the like.

What is claimed is:

1. A polarizing element, comprising:
   a substrate including a first groove and a second groove;
   a metal portion extending in one direction between the first groove and the second groove, the metal portion being in contact with the substrate;
   a light absorbing portion stacked on a surface of the metal portion that faces away from the substrate, the light absorbing portion having a width that is greater than a width of the metal portion in a cross-sectional view, the light absorbing portion and the metal portion being in direct contact with each other; and
   a silicon oxide film covering a side surface of the first groove, a side surface of the second groove, a side surface of the metal portion, and a side surface of the light absorbing portion, wherein
   a sum of a thickness of the silicon oxide film and a width of the metal portion is less than a width of the light absorbing portion in a cross-sectional view, and
   in the cross-sectional view, the light absorbing portion and the metal portion form a protrusion protruding away from the substrate and having a top farthest from the substrate, with the light absorbing portion being at the top of the protrusion.

2. The polarizing element according to claim 1, wherein a thickness of the silicon oxide film at a bottom portion of a groove between the metal portion and another metal portion adjacent to the metal portion is less than a thickness of the silicon oxide film at the side surface of the metal portion.

3. The polarizing element according to claim 2, wherein the silicon oxide film is not provided at the bottom portion of the groove.

4. The polarizing element according to claim 1, wherein a thickness of the silicon oxide film at an opposite side of the light absorbing portion from the metal portion is less than a thickness of the silicon oxide film at the side surface of the metal portion.

5. The polarizing element according to claim 4, wherein the silicon oxide film is not provided at an opposite side of the light absorbing portion from the metal portion.

6. The polarizing element according to claim 1, wherein the silicon oxide film is provided at a bottom portion of a groove between the metal portion and another metal portion adjacent to the metal portion, and a thickness of the silicon oxide film at the bottom portion is less than a thickness of the silicon oxide film at the side surface of the metal portion.

7. The polarizing element according to claim 1, wherein the width of the metal portion is a constant in the cross-sectional view.

8. A liquid crystal apparatus, comprising:
   a polarizing element; and
   a liquid crystal panel,
   the polarizing element having:
      a substrate including a first groove and a second groove;
      a metal portion extending in one direction between the first groove and the second groove, the metal portion being in contact with the substrate;
      a light absorbing portion stacked on a surface of the metal portion that faces away from the substrate, the light absorbing portion having a width that is greater than a width of the metal portion in a cross-sectional view, the light absorbing portion and the metal portion being in direct contact with each other; and
      a silicon oxide film covering a side surface of the first groove, a side surface of the second groove, a side surface of the metal portion, and a side surface of the light absorbing portion,
   wherein
   a sum of a thickness of the silicon oxide film and a width of the metal portion is less than a width of the light absorbing portion in a cross-sectional view,
   in the cross-sectional view, the light absorbing portion and the metal portion form a protrusion protruding away from the substrate and having a top farthest from the substrate, with the light absorbing portion being at the top of the protrusion, and
   the polarizing element is provided at at least one of a light incident side and a light emission side of the liquid crystal panel.

9. An electronic apparatus, comprising the liquid crystal apparatus according to claim 8.

10. The liquid crystal apparatus according to claim 8, wherein the silicon oxide film is provided at a bottom portion of a groove between the metal portion and another metal portion adjacent to the metal portion, and a thickness of the silicon oxide film at the bottom portion is less than a thickness of the silicon oxide film at the side surface of the metal portion.

11. The liquid crystal apparatus according to claim 8, wherein the width of the metal portion is a constant in the cross-sectional view.

* * * * *